United States Patent
Hwangbo et al.

[11] Patent Number: 5,856,960
[45] Date of Patent: Jan. 5, 1999

[54] SERVO CONTROLLING APPARATUS OF OPTICAL DISK DRIVE AND CONTROL METHOD THEREOF

[75] Inventors: Min Hwangbo, Anyang; Byeong-ho Park, Suwon; Sung-ro Go, Gunpo, all of Rep. of Korea

[73] Assignee: Samsung Electronics Co., Ltd., Kyungki-Do, Rep. of Korea

[21] Appl. No.: 856,816

[22] Filed: May 15, 1997

[30] Foreign Application Priority Data

Jun. 15, 1996 [KR] Rep. of Korea .................. 1996-16244

[51] Int. Cl.$^6$ ...................................................... G11B 7/00
[52] U.S. Cl. .................................... 369/44.28; 369/44.29; 369/44.35; 369/44.36
[58] Field of Search .............................. 369/44.27, 44.28, 369/44.29, 44.35, 44.36, 32

[56] References Cited

U.S. PATENT DOCUMENTS

| | | | |
|---|---|---|---|
| 4,951,273 | 8/1990 | Yoshida et al. | 369/44.31 |
| 5,361,247 | 11/1994 | Fuji et al. | 369/58 |
| 5,412,632 | 5/1995 | Mita et al. | 369/58 |

*Primary Examiner*—Nabil Hindi
*Attorney, Agent, or Firm*—Sughrue, Mion, Zinn, Macpeak & Seas, PLLC

[57] ABSTRACT

A servo controlling apparatus of an optical disk drive and a control method thereof are provided for achieving precise control by automatically controlling the gain of error signals caused by the difference in the amount of light irradiated during recording and reproducing, and then using the automatically gain-controlled signal. In a first control step, a focus error signal and a tracking error signal generated from a photodetecting portion via an operator are multiplied by a predetermined value in different multipliers, and then each obtained value is divided by an RF sum signal to control the value of error to within a predetermined target value. In a second control step, each multiplied focus error signal and tracking error signal are divided by a DC signal corresponding to the average level of the RF sum signal when the error value reaches the target value.

11 Claims, 4 Drawing Sheets

SERVO CONTROLLING APPARATUS OF OPTICAL DISK DRIVE AND CONTROL METHOD THEREOF

BACKGROUND OF THE INVENTION

The present invention relates to a servo controlling apparatus of an optical disk drive and a control method thereof, and more particularly, to a servo controlling apparatus of an optical disk drive and a control method thereof for controlling the gain of an error signal caused by a difference in the amount of light irradiated during recording and reproducing and controlling the error signal to within a target value.

Generally, the intensity of light required for recording information on an optical disk is much higher than that for reproducing information from the disk. Thus, an optical disk drive for recording and reproducing includes a light source of which the intensity of light irradiated onto the optical disk can be controlled according to the recording and reproducing modes.

The amount of light reflected from the disk differs according to the difference in the intensity of light irradiated onto the optical disk (hereinafter, referred to as "disk") during recording and reproducing. Thus, a change of the detected error signal due to the difference in the amount of reflected light affects the gain of the whole control system for a servo controlling apparatus of the optical disk drive. Accordingly, there are oscillations in the servo control circuit.

SUMMARY OF THE INVENTION

To solve the above problem, it is an object of the present invention to provide a servo controlling apparatus of an optical disk drive and a control method thereof for controlling the gain of an error signal detected as the difference in the amount of light reflected from a disk during recording and reproducing, so that stable and precise driving control can be achieved.

According to an aspect of the present invention, there is provided a servo controlling apparatus of an optical disk drive comprising: a photodetecting portion including photodetectors for outputting an electrical signal corresponding to the amount of an incident light; an operator for generating error signals obtained by performing operation on electrical signals output from the photodetectors and an RF sum signal obtained by summing the electrical signals output from the photodetectors; a DC signal source for generating a DC signal corresponding to the average level of the RF sum signal; a first switching portion for selectively outputting the input RF sum signal and DC signal according to a predetermined control signal; an automatic gain controlling (AGC) portion for multiplying the values of error signals by a predetermined value and dividing the multiplied result by the value of the signal output from the first switching portion; and a controlling portion for decreasing the error signal value using the signal output from the AGC portion and controlling the output of the first switching portion.

According to another aspect of the present invention, there is provided a servo controlling method for a servo controlling apparatus of an optical disk drive, comprising the steps of: controlling the value of the error signal to within a predetermined target value using the signal output from an AGC portion by controlling a first switching portion to output the RF sum signal; and controlling the first switching portion to output the DC signal when the value of the error signal reaches the target value.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
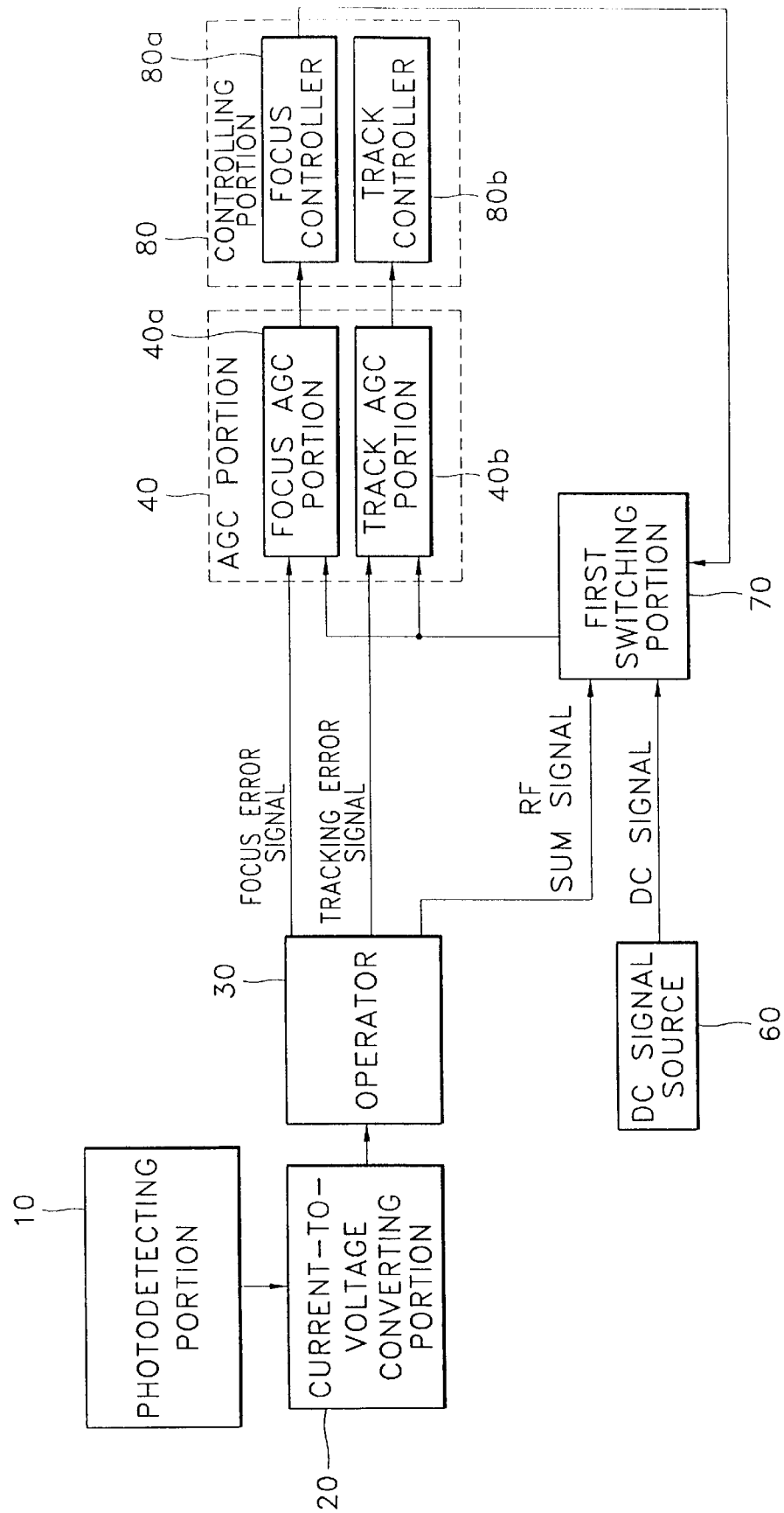
FIG. 1 is a block diagram of a servo controlling apparatus of an optical disk drive according to the present invention.

Referring to FIG. 1, a servo controlling apparatus of an optical disk drive according to the present invention includes a photodetecting portion 10 for generating an electrical signal in response to the amount of an incident light received, an operator 30 for generating error signals and an RF sum signal by receiving the signals output from the photodetecting portion 10 via a current-to-voltage converting portion 20, and an automatic gain controlling (AGC) portion 40 for controlling the gain using a predetermined operating equation by receiving the error signals and the signal output from a first switching portion 70 to output gain-controlled signals to a controlling portion 80. The first switching portion 70 selectively outputs the RF sum signal output from the operator 30 and a DC signal output from a DC signal source 60.

Figure 2:
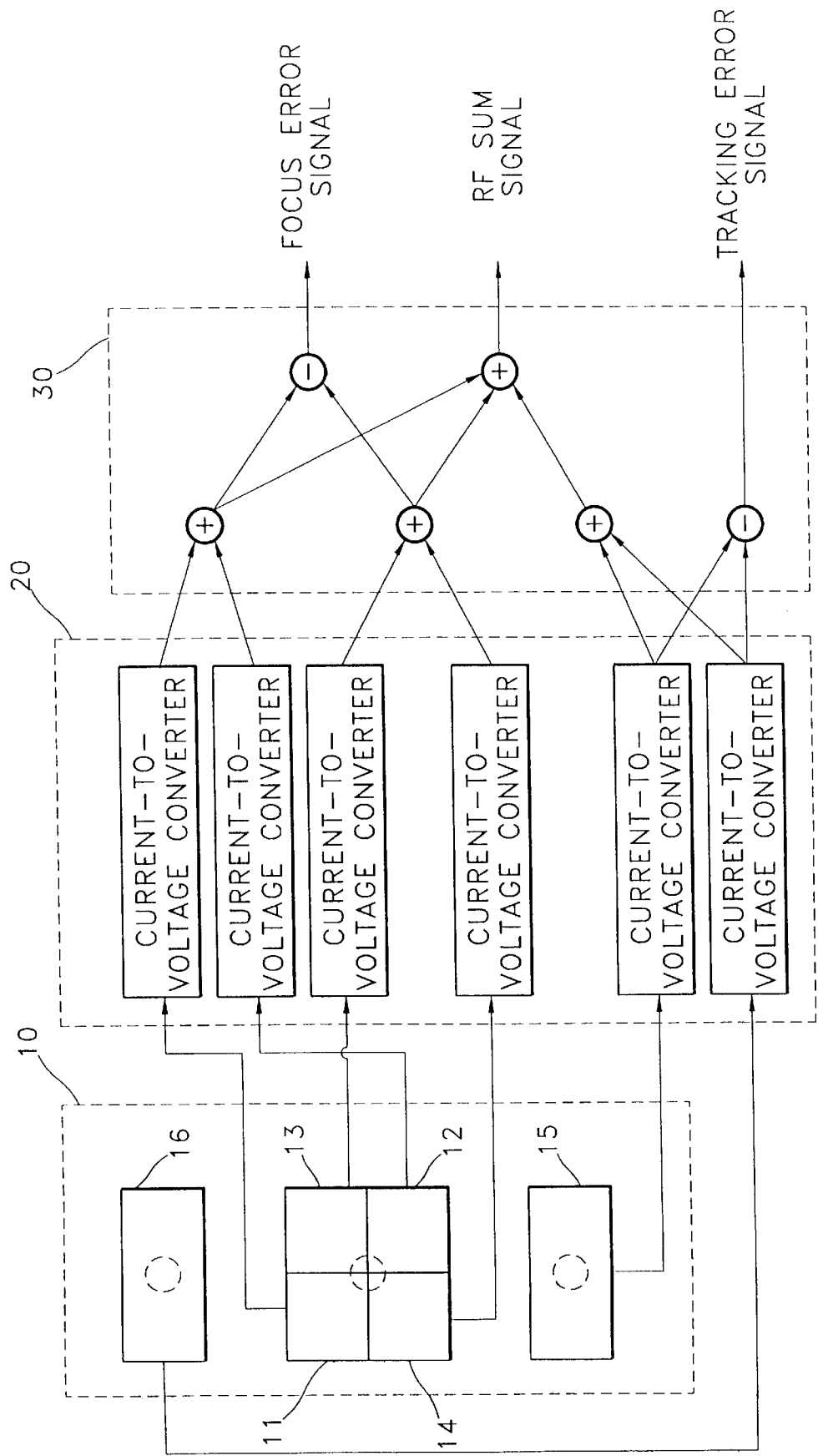
FIG. 2 is a detailed block diagram of the photodetecting portion, the current-to-voltage converting portion and the operator of FIG. 1.

Referring to FIG. 2, the photodetecting portion 10 has a first detecting unit including four photodetectors 11, 12, 13 and 14 for detecting a focus error, and a second detecting unit including two photodetectors 15 and 16 for detecting a tracking error. As the photodetectors 11 through 16, a photoelectric device such as a photo diode which outputs a current proportional to the amount of light incident thereon is used. The focus error occurs when the light emitted from a light source (not shown) is not accurately focused on a disk (not shown), and the tracking error occurs when the optical spot deviates from a track on which data is recorded or to be recorded in the lateral direction.

The currents output from the photodetecting portion 10 according to the above errors are converted into voltage signals by the current-to-voltage converting portion 20. The voltage signals are then sent to operator 30.

The operator 30 performs operations on the voltage signals each corresponding to photodetectors 11 through 16 to output a focus error signal, a tracking error signal and an RF sum signal. The focus error signal is obtained by subtracting a second sum signal from a first sum signal. Here, the first sum signal is a signal obtained by summing the voltage signals corresponding to photodetectors 11 and 12 diagonally situated from each other in the first detecting unit, and the second sum signal is a signal obtained by summing the voltage signals corresponding to the other photodetectors 13 and 14 of the first detecting unit. The tracking error signal is obtained as the difference between the voltage signals corresponding to two photodetectors 15 and 16 of the second detecting unit. Also, the RF sum signal is obtained by summing the voltage signals corresponding to all six photodetectors 11 through 16 of the first and second detecting units.

The focus error signal, tracking error signal and RF sum signal generated from the operator 30 are sent to the AGC portion 40 and the first switching portion 70 of FIG. 1. The AGC portion 40 includes a focus AGC portion 40a and a track AGC portion 40b. Also, the controlling portion 80 includes a focus controller 80a and a track controller 80b (see FIG. 4).

Figure 3:
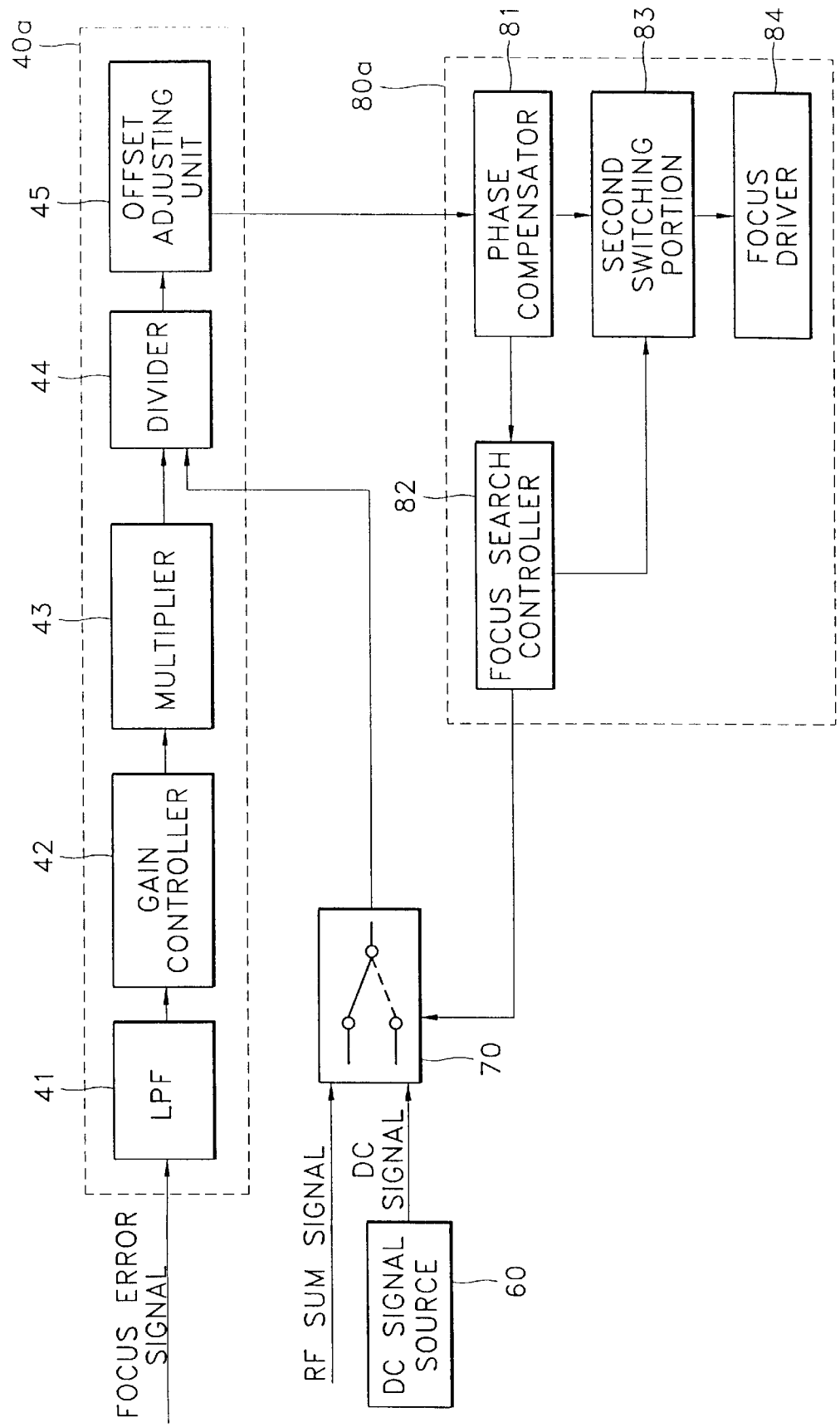
FIGS. 3 and 4 are detailed block diagrams of the automatic gain controlling (AGC) portion and the controlling portion of FIG. 1.

The focusing of light emitted from an optical pickup (not shown) is controlled by a focus servo-control system according to the focus error signal and the RF sum signal, which will be described with reference to FIG. 3. The focus servo-system includes the focus AGC portion 40a and the focus controller 80a. Here, the focus AGC portion 40a multiplies the focus error signal output from the operator 30 by a predetermined value and divides the obtained result by a value output from the first switching portion 70, and the focus controller 80a controls the focus error by receiving the automatically gain-controlled signal output from the focus AGC portion 40a.

The first switching portion 70 is controlled by a focus search controller 82 of the focus controller 80a to selectively output the RF sum signal output from the operator 30 and the DC signal output from the DC signal source 60. That is, the RF sum signal is output at the initial operation of the servo controlling apparatus, and the DC signal is output when focusing control is achieved to a predetermined target value. The DC signal output from the DC signal source 60 has the level of the average value of the RF sum signal.

The focus AGC portion 40a for outputting a stable gain through the gain control in response to the change in the amount of light has a low-pass filter (LPF) 41, a gain controller 42, a multiplier 43, a divider 44 and an offset adjusting unit 45. The LPF 41 filters a noise component of the focus error signal to provide a stable gain in the low frequency band. The gain controller 42 controls the gain of the focus error signal from which the noise is filtered to be suitable for the focus servo control, and outputs the result to the multiplier 43. The output signal is amplified by a predetermined integer by the multiplier 43. Also, the divider 44 divides the output signal amplified by the multiplier 43 by the signal applied from the first switching portion 70. The offset adjusting unit 45 removes a DC offset component of the signal output from the divider 44 and applies the result to the focus controller 80a.

The focus controller 80a includes a phase compensator 81, the focus search controller 82, a second switching portion 83 and a focus driver 84. The phase compensator 81 compensates for the phase difference of the signal output from the offset adjusting unit 45 in order to ensure a stable frequency band corresponding to the characteristics of a focus actuator for driving an optical pickup, and outputs the result to the focus search controller 82 and the second switching portion 83. The focus search controller 82 outputs a focus search signal such that the focus actuator is set to within a predetermined area in which the focus can be controlled. Also, the focus search controller 82 reads the signal output from the focus AGC portion 40a to control the first switching portion 70 such that the DC signal is output from the first switching portion 70 when the focus error value reaches within a predetermined target value.

The focus search signal is applied to the focus driver 84 at the initial operation of the optical disk drive, which is for moving the focus actuator in the vertical direction with respect to the surface of the disk at the initial state where the determination of the existence of the optical pickup within a control range of a focus control loop is not performed yet. The focus search controller 82 determines whether the optical pickup is within the control range of the focus control loop during the application of the focus search signal using a signal output from the phase compensator 81. If the optical pickup is within the control range, the focus search controller 82 controls the second switching portion 83 such that the output signal of the phase compensator 81 is applied to the focus driver 84.

The focus driver 84 drives the focus actuator according to a signal output from the second switching portion 83 by applying current for generating a torque required for the driving of the focus actuator.

Figure 4:
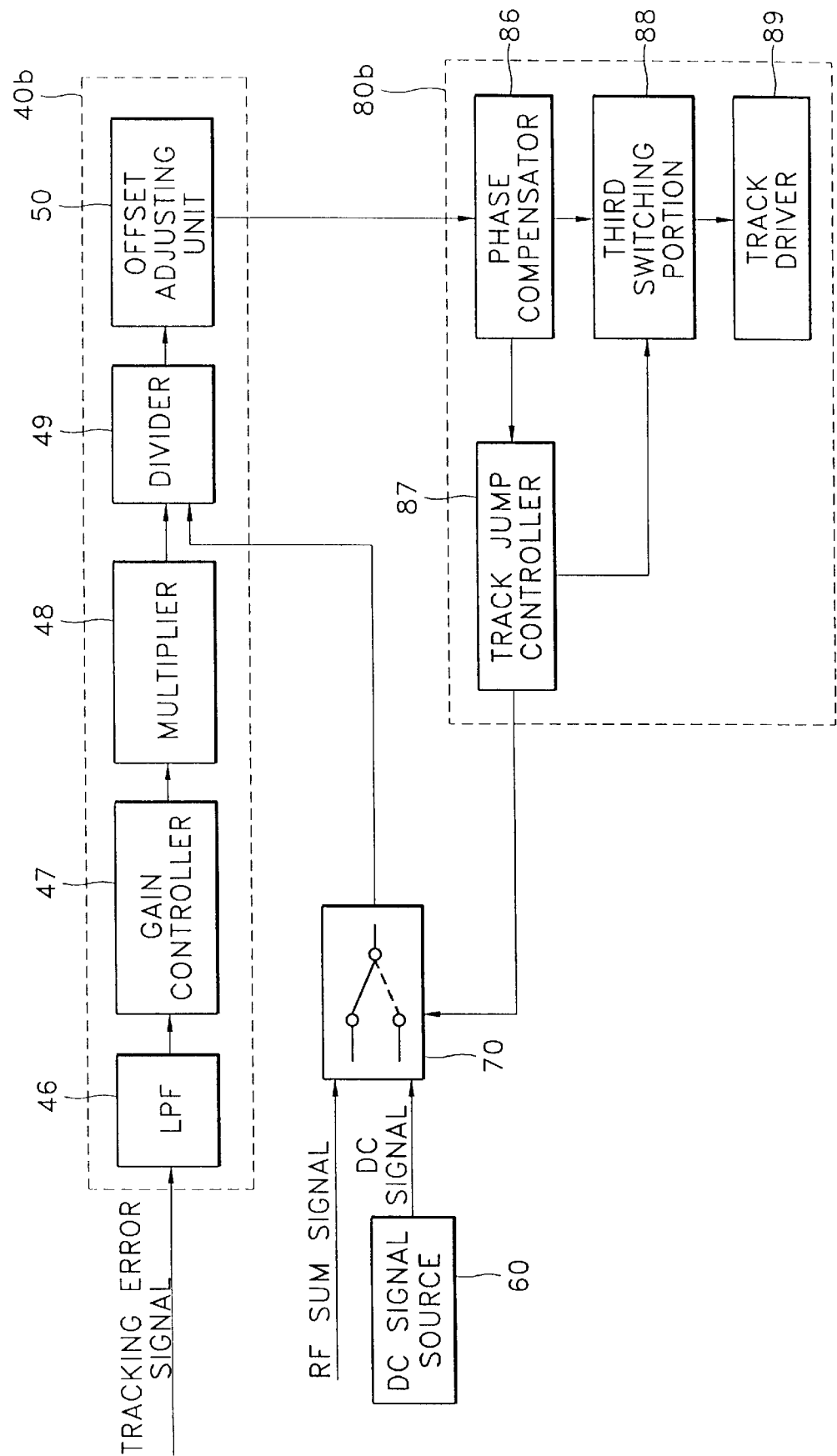

On the other hand, tracking of light emitted from the optical pickup is controlled by a track servo system according to the tracking error signal and the RF sum signal, which will be described with reference to FIG. 4.

The track servo-system includes the track AGC portion 40b and the track controller 80b. The track AGC portion 40b multiplies the tracking error signal by a predetermined value and divides the resultant value by the signal output from the first switching portion 70, and the track controller 80b controls the tracking error by receiving the automatically gain-controlled signal output from the track AGC portion 40b.

The track AGC portion 40b operates on the tracking error signal and the signal output from the first switching portion 70 to have a stable gain according to the change in the amount of light and outputs the result. The track AGC portion 40b includes a low-pass filter (LPF) 46, a gain controller 47, a multiplier 48, a divider 49 and an offset adjusting unit 50, which function similarly to the elements of the focus AGC portion 40a.

The track controller 80b includes a phase compensator 86, a track jump controller 87, a third switching portion 88 and a track driver 89. The phase compensator 86 compensates for the phase difference of the signal output from the offset adjusting unit 50 in order to ensure a stable frequency band corresponding to the characteristic of a track actuator for driving the optical pickup, and outputs the result to the track jump controller 87 and the third switching portion 88.

The track jump controller 87 controls the third switching portion 88 by receiving a selection signal from the user such as a signal for jumping the optical pickup to a desired track, a signal for sequentially moving the optical pickup from an inner track to an outer track and a signal for the optical pickup to repeatedly trace the current track, to selectively output the user's selection signal to the track driver 89. For example, when a track jump signal is input, the track jump controller 87 outputs the corresponding track jump driving voltage to the track driver 89 via the third switching portion 88.

The third switching portion 88 selectively outputs the signal output from the phase compensator 86 and the signal output from the track jump controller 87 according to the control of the track jump controller 87.

The track driver 89 drives a track actuator according to the signal output from the third switching portion 88 by applying current to generate a torque required for the driving of the track actuator.

A control method of the servo controlling apparatus of an optical disk according to the present invention will now be described.

First, the gain of an error signal which occurs at an initial operation due to the difference in the reflective index of the adopted disk and the changes in intensity of light emitted from a light source is controlled in a first control step. In the first control step, the RF sum signal is output from the first switching portion 70 of FIG. 1, and an error value is controlled to be within a predetermined target value using the signal output from the AGC portion 40. That is, the error signal output from the operator 30 after being generated from the photodetecting portion 10 is multiplied by a predetermined value and then the resultant value is divided by the RF sum signal value in the AGC portion 40, so that the gain of the error signal is controlled. Thus, an error signal whose gain is controlled within a predetermined range can be obtained even though the amount of light incident onto the photodetecting portion 10 changes drastically.

If the amount of detected light increases as in the recording process, the levels of the error signals (focus error signal and tracking error signal) and the RF sum signal which have passed the operator 30 increase proportionally to the increase in the intensity of light. Here, the increasing value of the RF sum signal is greater than that of the error signal. Thus, the difference in the error signals output from the operator 30 according to the change in intensity of light is compensated for by multiplying the error signals by a predetermined integer and then the resultant value is divided by the RF sum signal. Accordingly, an error signal controlled in a stable gain can be applied to the controlling portion 80 regardless of the change in the amount of detected light.

Then, an offset component of the signal whose gain is controlled by multiplication and division is removed and the result is output to the controlling portion 80. Here, the offset component is caused by a track cross signal included in the RF sum signal when the optical pickup jumps to an intended track.

Then, the controlling portion 80 controls the amount of the gain-controlled focus error signal and tracking error signal to decrease to a target value.

In the second control step, when the value of the error signal reaches the target value, a DC signal corresponding to the average level of the RF sum signal is output from the first switching portion 70. Here, the error signal multiplied by a predetermined value is divided by the DC signal corresponding to the average level of the RF sum signal, so that the gain of the error signal is controlled.

In order to precisely move an optical pickup along a track of the disk in which information is recorded, the exact number of tracks should be counted. Generally, the RF sum signal includes a track cross signal generated by the movement of the optical pickup from an inner track to an outer track or vice versa. Thus, when the multiplied error signal is divided by the RF sum signal, the automatically gain-controlled signal includes other signals except the error signals, thereby decreasing precision in a track count control.

In the second control step, the multiplied error signal is divided by a DC signal corresponding to the average level of the RF sum signal to provide an automatically gain-controlled signal, and error control is performed by using the automatically gain-obtained signal, thus obtaining a stable gain control according to the change in the amount of light and reducing errors in the error correction.

As described above, the gain of the error signals generated for precisely recording/reproducing information to/from a disk is controlled in a different manner during the initial operation where information of light reflected from the disk is not identified yet than after the value of the error signal reaches a predetermined target value, thus allowing precise focus control and track control.

What is claimed is:

1. A servo controlling apparatus of an optical disk drive comprising:

a photodetecting portion including photodetectors for outputting electrical signals corresponding to an amount of incident light;

an operator for generating an error signal obtained by performing an operation on the electrical signals output from the photodetectors and an RF sum signal obtained by summing the electrical signals output from the photodetectors;

a DC signal source for generating a DC signal corresponding to the average level of the RF sum signal;

a first switching portion for selectively outputting the RF sum signal and the DC signal as a first switching portion output signal according to a predetermined control signal;

an automatic gain controlling (AGC) portion for multiplying the value of the error signal by a predetermined value to produce a multiplied result and dividing the multiplied result by a value of the first switching portion output signal; and a controlling portion for decreasing the value of the error signal using the signal output from the AGC portion and controlling the output of the first switching portion.

2. A servo controlling apparatus as claimed in claim 1, wherein the photodetecting portion-includes at least four first photodetectors for detecting focus error information and at least two second photodetectors for detecting tracking error information.

3. A servo controlling apparatus as claimed in claim 2, wherein the operator generates a focus error signal by summing and subtracting signals output from the first photodetectors, a tracking error signal by subtracting signals output from the second photodetectors, and an RF sum signal by summing all signals output from the first and second photodetectors, and the AGC portion includes a focus AGC portion for automatically controlling the gain of the focus error signal and a track AGC portion for automatically controlling the gain of the tracking error signal.

4. A servo controlling apparatus as claimed in claim 3, wherein the focus AGC portion comprises:

a low-pass filter (LPF) for filtering noise from the focus error signal;

a gain controller for controlling the gain of the signal output from the LPF to a predetermined gain;

a multiplier for multiplying a signal passed through the gain controller by a predetermined integer to produce a multiplied signal;

a divider for dividing the multiplied signal by a signal applied from the first switching portion to produce a divided signal; and an offset adjusting unit for adjusting an offset component of the divided signal output from the divider.

5. A servo controlling apparatus as claimed in claim 3, wherein the track AGC portion comprises:

a low-pass filter (LPF) for filtering noise from the tracking error signal;

a gain controller for controlling the gain of the signal output from the LPF to a predetermined gain;

a multiplier for multiplying a signal passed through the gain controller by a predetermined integer to produce a multiplied signal;

a divider for dividing the multiplied signal by a signal applied from the first switching portion to produce a divided signal; and an offset adjusting unit for adjusting an offset component of the signal output from the divider.

6. A servo controlling apparatus as claimed in claim 3, wherein the controlling portion comprises:

a focus controller for controlling focus by receiving a signal output from the focus AGC portion; and a track controller for controlling tracking by receiving a signal output from the track AGC portion.

7. A servo controlling apparatus as claimed in claim 6, wherein the focus controller comprises:

a focus driver for driving a focus actuator according to an input signal to decrease the value of the focus error signal;

a focus search controller for generating a focus search signal to set the focus actuator to within a predetermined range in which the focus can be controlled, and for controlling the first switching portion to output the DC signal from the first switching portion when the value of the focus error output from the focus AGC portion reaches a predetermined target value; and a second switching portion for outputting the focus search signal to the focus driver when the focus search signal is input, and outputting the signal output from the focus AGC portion to the focus driver when the focus search signal is not input.

8. A servo controlling apparatus as claimed in claim 7, wherein the focus controller further comprises:

a phase compensator for compensating for a phase difference of the signal output from the AGC portion to be suitable for driving the focus actuator to produce a phase compensated signal, and outputting the phase compensated signal to the second switching portion.

9. A servo controlling apparatus as claimed in claim 6, wherein the track controller comprises:

a track jump controller for generating a track jump signal for determining track movement;

a third switching portion for selectively outputting the track jump signal when the track jump signal is input and the signal output from the track AGC portion when the track jump signal is not input; and a track driver for driving a track actuator according to the signal output from the third switching portion such that the value of the tracking error signal decreases.

10. A servo controlling apparatus as claimed in claim 9, wherein the track controller further comprises:

a phase compensator for compensating for a phase difference of the signal output from the track AGC portion to stabilize the track actuator.

11. A servo controlling method for a servo controlling apparatus of an optical disk drive, including a photodetecting portion having photodetectors for outputting an electrical signals corresponding to an amount of incident light received; an operator for generating an error signal obtained by operating the electrical signals output from the photodetectors and an RF sum signal obtained by summing the electrical signals output from the photodetectors; a DC signal source for generating a DC signal corresponding to the average level of the RF sum signal; a first switching portion for selectively outputting the RF sum signal and DC signal according to a predetermined control signal; an automatic gain controlling (AGC) portion for multiplying the value of the error signal by a predetermined value and dividing the multiplied result by the value of the signal output from the first switching portion; and a controlling portion for decreasing the error signal value using the signal output from the AGC portion and controlling the output of the first switching portion, the method comprises the steps of:

controlling the value of the error signal to within a predetermined target value using the signal output from the AGC portion by controlling the first switching portion to output the RF sum signal; and controlling the first switching portion to output the DC signal when the value of the error signal reaches the target value.

\* \* \* \* \*